(12) United States Patent
Crane et al.

(10) Patent No.: US 7,054,777 B2
(45) Date of Patent: May 30, 2006

(54) TEST DEVICE AND METHOD FOR TESTING A RAIL CAR BRAKE SYSTEM

(75) Inventors: Jerry D. Crane, Anderson, SC (US); Scott G. Edwards, Anderson, SC (US); Kathryn M. Edwards, Anderson, SC (US); Alan R. Granger, Easley, SC (US); William E. Masek, Anderson, SC (US)

(73) Assignee: Graham-White Mfg. Co., Salem, VA (US)

( * ) Notice: Subject to any disclaimer, the term of this patent is extended or adjusted under 35 U.S.C. 154(b) by 0 days.

(21) Appl. No.: 10/949,888

(22) Filed: Sep. 25, 2004

(65) Prior Publication Data

US 2006/0074581 A1    Apr. 6, 2006

(51) Int. Cl.
*G06F 19/00* (2006.01)
(52) U.S. Cl. .................................... 702/114
(58) Field of Classification Search ............... 73/39; 702/114
See application file for complete search history.

(56) References Cited

U.S. PATENT DOCUMENTS 5,808,909 A * 9/1998 Rees ........................ 702/114
2005/0021294 A1 * 1/2005 Trsar et al. ................ 702/183

OTHER PUBLICATIONS

Code of Air Brake System Tests for Freight Equipment—Single Car Test; pp. E-1 to E-19; AAR Manual of Standards and Recommended Practices—Brakes and Equipment, 2004.

* cited by examiner

*Primary Examiner*—John Barlow
*Assistant Examiner*—Cindy D. Khuu
(74) *Attorney, Agent, or Firm*—Dority & Manning, P.A.

(57) ABSTRACT

The present invention discloses and claims a test device and method for testing a rail car brake system. The test device includes a pneumatic circuit and electronic circuit connecting a supply of test air to the rail car brake system being tested. The pneumatic and electronic circuits operate to selectively supply and vent the test air to or from the rail car brake system according to programmed instructions. The test device further includes a web server interface for communicating with a predetermined web page or other source external to the rail car brake system test device to retrieve and download additional programming instructions.

36 Claims, 4 Drawing Sheets

TEST DEVICE AND METHOD FOR TESTING A RAIL CAR BRAKE SYSTEM

BACKGROUND OF THE INVENTION

Railway trains and cars typically include a pneumatic brake system. The brake system is critical to the safe operation of the rail cars and is therefore subject to periodic testing to ensure the integrity and satisfactory performance of the brake system. The present invention provides a test device and method for testing the brake system on a rail car.

In the United States, the Association of American Railroads (AAR), in conjunction with the Federal Railway Administration, has promulgated and adopted a Manual of Standards and Recommended Practices. Included in this manual is Standard S-486 for testing the brake system on a rail car. In general, Standard S-486 includes a series of tests that measure the pressure and flow rate of the air in the brake system under various conditions. These pressure and flow rate measurements are then used to verify that the brake system has sufficient physical integrity and will perform satisfactorily under expected operational conditions.

Various devices and methods exist to test rail car brake systems. For example, Standard S-486, incorporated herein by reference in its entirety for all purposes, describes and illustrates a brake system test device commonly known to one of ordinary skill in the art.

The test device described and illustrated in Standard S-486 includes a valve manifold to connect a supply of test air to the brake system being tested. The valve manifold generally includes a dual-pressure reducing valve, a six position rotary valve, and a ⅜ inch vent valve connected in series between the air supply and the brake system being tested. The dual-pressure reducing valve has two selectable positions to reduce the air supply to either 80 psig or 90 psig. The six position rotary valve selectively supplies or vents test air to or from the brake system through various sized orifices. The vent valve provides a ⅜ inch orifice for rapidly venting test air from the brake system. In addition, the test device further includes a pressure gauge and venturi flow meter for measuring the test air.

An operator using the test device described and illustrated in Standard S-486 must manually position each of the selectable valves to the proper position and in the exact sequence recited in the various tests to correctly perform each brake test. In addition, the operator must also accurately observe, interpret, and record the various pressure and flow rate measurements at the proper times to perform a valid test of the brake system. As a result, various errors can occur in the brake system test due to operator error.

Another device presently available for performing the brake tests recited in Standard S-486 is described in U.S. Pat. No. 5,808,909 issued to Rees. The test device described in this patent includes a valve manifold and pressure and flow rate sensors for performing the functions and measurements required by Standard S-486. This test device further includes a controller programmed to operate the valve manifold as prescribed by Standard S-486 and to record measurements from the pressure and flow rate sensors, thus potentially eliminating sources of operator error. According to the patent, the controller can be reprogrammed to perform different brake tests. However, the reprogramming requires individual action for each test device. This individual action causes delays in subsequent brake tests, requires additional skilled labor sufficiently knowledgeable to perform the reprogramming, and create an additional opportunity for operator error in effecting any programming changes.

As a result, the need exists for an improved test device that can not only accurately perform the brake system tests required in the industry, but that can also be reliably and rapidly updated to adapt to changing demands in the industry.

SUMMARY OF THE INVENTION

Objects and advantages of the invention are set forth below in the following description, or may be obvious from the description, or may be learned through practice of the invention.

In one embodiment of the present invention, a test device for testing a rail car brake system includes an air supply, a valve manifold, a control circuit, a power supply, and a web server interface. The air supply provides test air to the rail car brake system being tested. The valve manifold connects between the air supply and the rail car brake system, and the valve manifold includes a valve for selectively supplying and venting the test air to or from the rail car brake system and a sensor for measuring the test air. The control circuit operatively connects with the valve manifold for selectively positioning the valve and recording a measurement from the sensor. The power supply connects to the control circuit for providing electrical power to the control circuit. The web server interface is in communication with the control circuit. The web server interface is configured to receive programming instructions from a predetermined web page and to communicate the programming instructions to the control circuit for testing the rail car brake system.

In particular embodiments, the valve manifold may further include a solenoid operated valve that is positioned by the control circuit. Furthermore, the valve manifold may include a pressure sensor for measuring the pressure of the test air and/or a flow sensor for measuring the flow rate of the test air. In still further embodiments, the valve manifold may include a thermal bypass valve for diverting a portion of the test air for selectively heating or cooling the rail car brake system test device.

In other particular embodiments, the web server interface may be configured to receive data from the control circuit and to communicate the data to a location external to the test device. The test device may further include a data entry device for communicating with the control circuit and/or a web browser for accessing the predetermined web page.

In another embodiment of the present invention, the web server interface is configured to receive programming instructions from a source external to the rail car brake system test device and to communicate the programming instructions to the control circuit for testing the rail car brake system. The source external to the rail car brake system test device may be a microprocessor, a predetermined web page, or other source having the programming instructions.

The present invention further includes a method for testing a rail car brake system using a test device. The method includes connecting a supply of test air to a valve manifold and connecting the valve manifold to the rail car brake system. A control circuit is operatively connected to the valve manifold, and programming instructions are retrieved from a predetermined web page. The programming instructions are communicated to the control circuit, and the control circuit executes the programming instructions to selectively position the valve manifold according to the programming instructions and measure the test air.

Additional methods within the scope of the present invention may include measuring a pressure and/or flow rate of the test air. Furthermore, the method may include recording measurements of the test air and/or transmitting the measurements to a location external to the test device. An alternate method may include diverting a portion of the test air through a thermal mechanism for selectively heating or cooling the test device using the test air.

Another embodiment of the present invention may include retrieving programming instructions from a source external to the test device. The external source may be a microprocessor, a predetermined web page, or other source external to the test device having the programming instructions.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
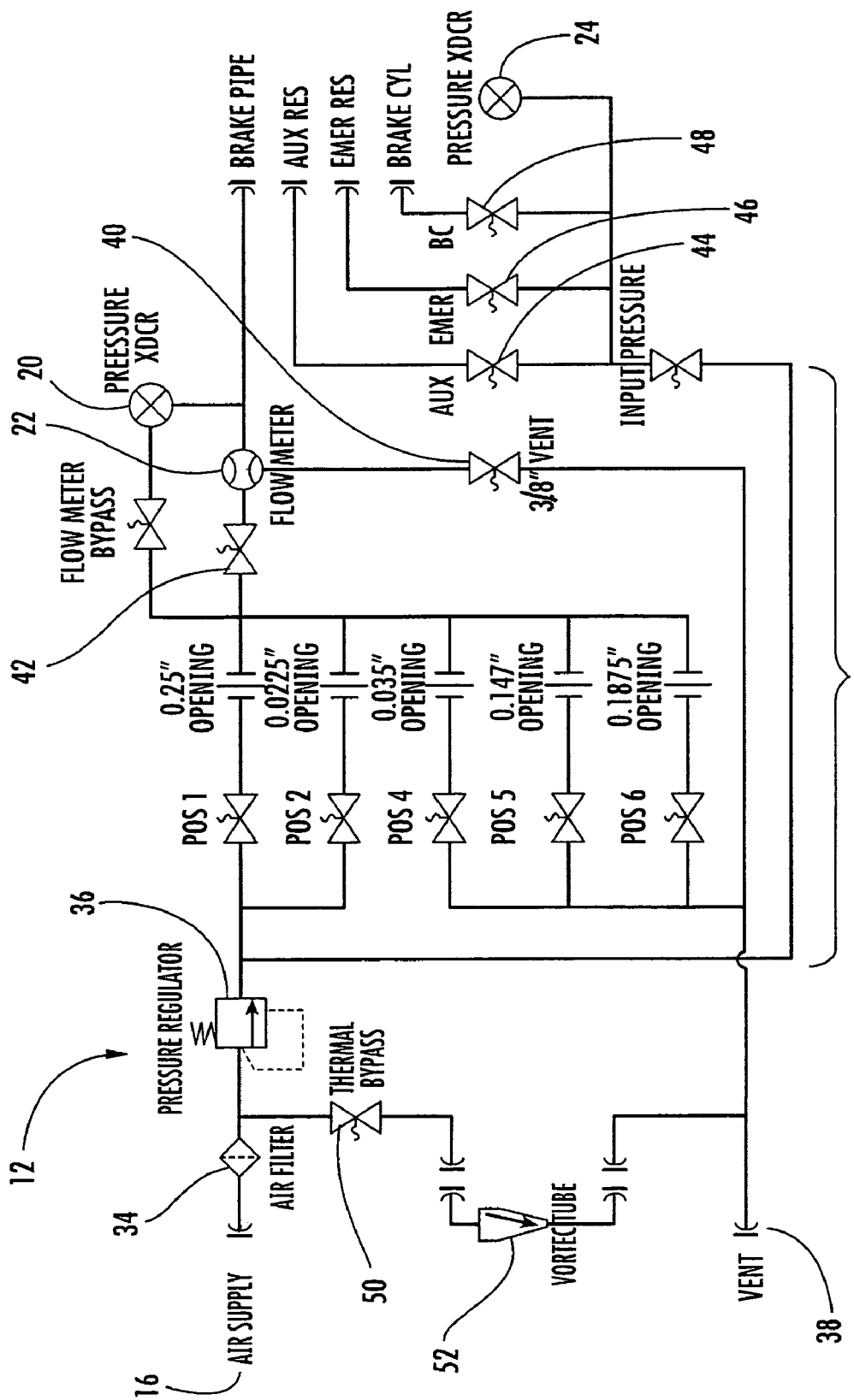
FIG. 1 is a block diagram of a pneumatic circuit according to an embodiment of the present invention.

Reference will now be made in detail to present embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention relates generally to a test device 10 and method for testing a rail car brake system. The test device 10 generally includes a pneumatic circuit 12 and an electrical circuit 14. The pneumatic circuit 12 connects a supply of test air 16 to a brake pipe of the brake system being tested. The pneumatic circuit 12 generally includes a valve manifold 18 and associated sensors 20, 22, 24. The electrical circuit 14 controls the operation of the valve manifold 18 and receives and records the various sensor measurements required by the particular test being performed. The electrical circuit 14 generally includes a low voltage power supply 26, a control circuit 28, and a web server interface 30. Although particular embodiments of the pneumatic and electrical circuits are provided to describe and enable the present invention, these embodiments are provided for illustration only and are not intended to limit the scope of the present invention as recited in the claims.

FIG. 1 illustrates a block diagram of a pneumatic circuit 12 according to a particular embodiment of the present invention. As shown at the top left of FIG. 1, an air supply 16 provides test air to the pneumatic circuit 12. The air supply 16 must be capable of providing a sufficient volume of test air to meet the brake system test requirements. Standard S486 currently requires a minimum supply volume of 1700 cubic inches, although larger or smaller volumes are within the scope of the present invention. The top right of FIG. 1 illustrates the connection between the pneumatic circuit 12 and a brake pipe of the brake system being tested. The connections to the air supply and the brake pipe are made using quick disconnects, also known as "Glad-Hands," located on a front panel 32 of the test device 10, as will be described in more detail later.

After entering the pneumatic circuit 12, the test air first passes through an in-line filter 34 to remove contaminants from the test air. The test air then passes through a pressure regulator 36 to reduce the test air pressure to the particular pressure required by the brake test. The pressure regulator 36 may be any conventional regulator known to one of ordinary skill in the art, such as a Control Air Model M100, that is capable of reducing the pressure of the test air to the desired pressure.

The valve manifold 18 follows the regulator 36. The valve manifold 18 generally includes a set of five valves (labeled as POS 1, 2, 4, 5, and 6) and associated orifices (labeled with the respective orifice size). The specific placement of the valves and orifices emulate the function and operation of the six position rotary valve previously described and illustrated in Standard S-486. Depending on the particular positions of the five valves, the test air is either supplied to the brake pipe of the brake system being tested, vented to atmosphere 38, or held in a static condition.

The pneumatic circuit 12 also includes a ⅜ inch vent valve 40 for rapidly venting the test air to atmosphere during specific portions of the brake test. In addition, the pneumatic circuit 12 includes pressure sensors 20, 24 and a flow rate meter 22 as illustrated to measure the pressure and flow rate of the test air during various portions of the brake test. The particular sensors and meters used are not distinguishing features of the present invention and include any sensors and meters known to one of ordinary skill in the art for measuring the desired characteristics of the test air.

As shown in FIG. 1, the pneumatic circuit 12 may further include additional, optional components, the structure and function of which are readily apparent to one of ordinary skill in the art. For example, the pneumatic circuit 12 may include a valve 42 at the inlet of the flow rate meter 22 to prevent air flow through the meter during particular tests. Similarly, the pneumatic circuit 12 may include additional valves and associated piping for connecting the pneumatic circuit to additional portions of the brake system, such as an auxiliary reservoir 44, an emergency reservoir 46, and/or a brake cylinder 48. In particular embodiments, the pneumatic circuit 12 may also include a thermal bypass valve 50 for diverting a portion of the test air for selectively heating or cooling the test device 10. The diverted test air may pass through a thermal mechanism, such as a Model 220 Hot/Cold Vortex Air Conditioner made by ITW Vortec, where it is selectively heated or cooled. The heated or cooled diverted air is subsequently vented into the test device 10, allowing operation of the test device in environments ranging from −40 degrees Centigrade to 50 degrees Centigrade.

Each of the valves previously described or otherwise included in the pneumatic circuit 12 may be remotely operable valves, such as solenoid controlled valves, capable of being remotely and automatically operated by the electrical circuit 14, as will now be described in more detail.

Figure 2:
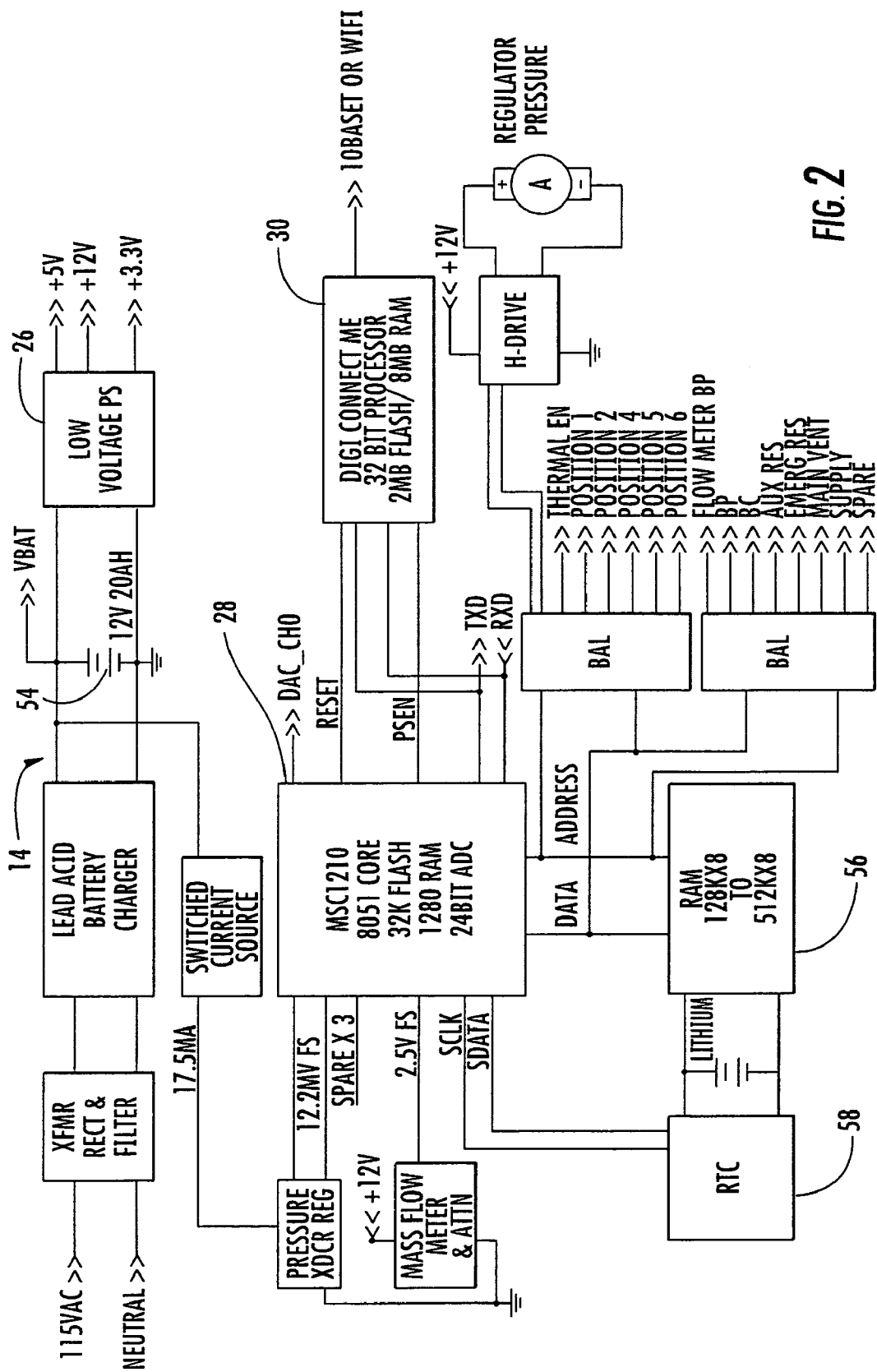
FIG. 2 is a block diagram of an electrical circuit according to an embodiment of the present invention.

FIG. 2 illustrates a block diagram of an electrical circuit 14 according to a particular embodiment of the present invention. As shown, the low voltage power supply 26 provides a reliable source of direct current power to various components in the electrical circuit. The supplied voltage may be 3.3 VDC, 5 VDC, and/or 12 VDC, depending on the components used and their power requirements. A rechargeable battery 54, such as a 12 volt lead-acid battery capable of providing 20 amp-hours of power between full charges, may be used to furnish power to the power supply. If a rechargeable battery is used, the power supply may include associated circuitry for re-charging the battery from an external AC or DC power source. Alternately, an external source of AC power may furnish power to the power supply, with the AC power rectified, regulated, and reduced, as necessary, to achieve the required low voltage, direct current.

The control circuit 28 includes a programmable processor that operates the pneumatic circuit 12 and stores test air data. The processor includes programming instructions to control the valves, take electrical measurements, store data, and communicate with the web server. A suitable processor within the scope of the present invention is a MSC 1210 processor manufactured by Texas Instruments. The MSC 1210 processor includes 32 K Bytes of onboard flash memory, 1280 Bytes of RAM, an 8 channel 24 bit analog to digital converter, and operates at 11.0592 MHz. The programming instructions cause the processor to send signals to bit addressable latches (BAL) to remotely operate the valves in the pneumatic circuit 12. The programming instructions also cause the processor to receive and record sensor measurements from the pneumatic circuit 12 as required by the brake test.

As shown in FIG. 2, the control circuit 28 may include additional, optional components, the structure and function of which are well known to one of ordinary skill in the art. For example, the control circuit 28 may include non-volatile RAM 56 external from the processor for increasing the storage capacity of the test device. In addition, the control circuit 28 may further include a real time clock (RTC) 58 for recording the date and time of various events and measurements.

The web server interface 30 comprises a plug-and-play device embedded in the electrical circuit 14 for providing Internet or world-wide-web-enabled network connectivity to the control circuit 28. Control of the tests is through the use of predefined web pages that carry the necessary state information to run the test as well as provide the necessary user interface information for human control and monitoring of the test. These predefined web pages are served on an as needed basis to either a locally connected web browser, or remotely across a TCP/IP link. Since the networked information is in a common "open" format, there is no need for a proprietary user application to be present on the user's computer to operate the test device. The web-enabled network connectivity permits the control circuit 28 to receive programming instructions, such as brake test revisions or changes, from predetermined web pages or other sources external to the test device. This network connectivity provides a high degree of quality control over the particular programming instructions available for downloading and also provides a method for rapid dissemination of programming instructions to multiple remote locations without requiring additional personnel.

The programming instructions may be downloaded directly from the predetermined web page or other external source, through the web server interface 30, to the control circuit 28. The downloaded programming instructions are then available for execution by the control circuit 28 during the next brake test. In addition, the control circuit 28 may upload brake test data through the web server interface 30 to a predetermined web page or other external location that is remote from the test device. In this manner, a single location can receive brake test data from multiple remote locations for review and analysis. The connection between the test device and a remote device can be across a standard Ethernet hardwired connection, or in another realization of this invention across a wireless (WiFi) Ethernet connection. This allows any wireless equipped PC to operate the test device without any special configuration.

A suitable web server interface 30 within the scope of the present invention is a Digi Connect ME module manufactured by Digi International. The Digi Connect ME module includes a 32 bit processor with 2 M Bytes of flash memory and 8 M Bytes of SDRAM. The web server interface 30 may connect to an Ethernet network card using a 10BaseT unshielded twisted pair (UTP) cable. Alternate embodiments within the scope of the present invention may use a WiFi interface for accessing the Internet. To access the Internet or world-wide-web, the web server interface 30 uses a web browser which may be internal or external to the test device. For example, the web browser may reside in a separate microcomputer included with the test device, or the web browser may reside external to the test device in a separate microcomputer, cellular telephone, PDA, or similar device.

Figure 3:
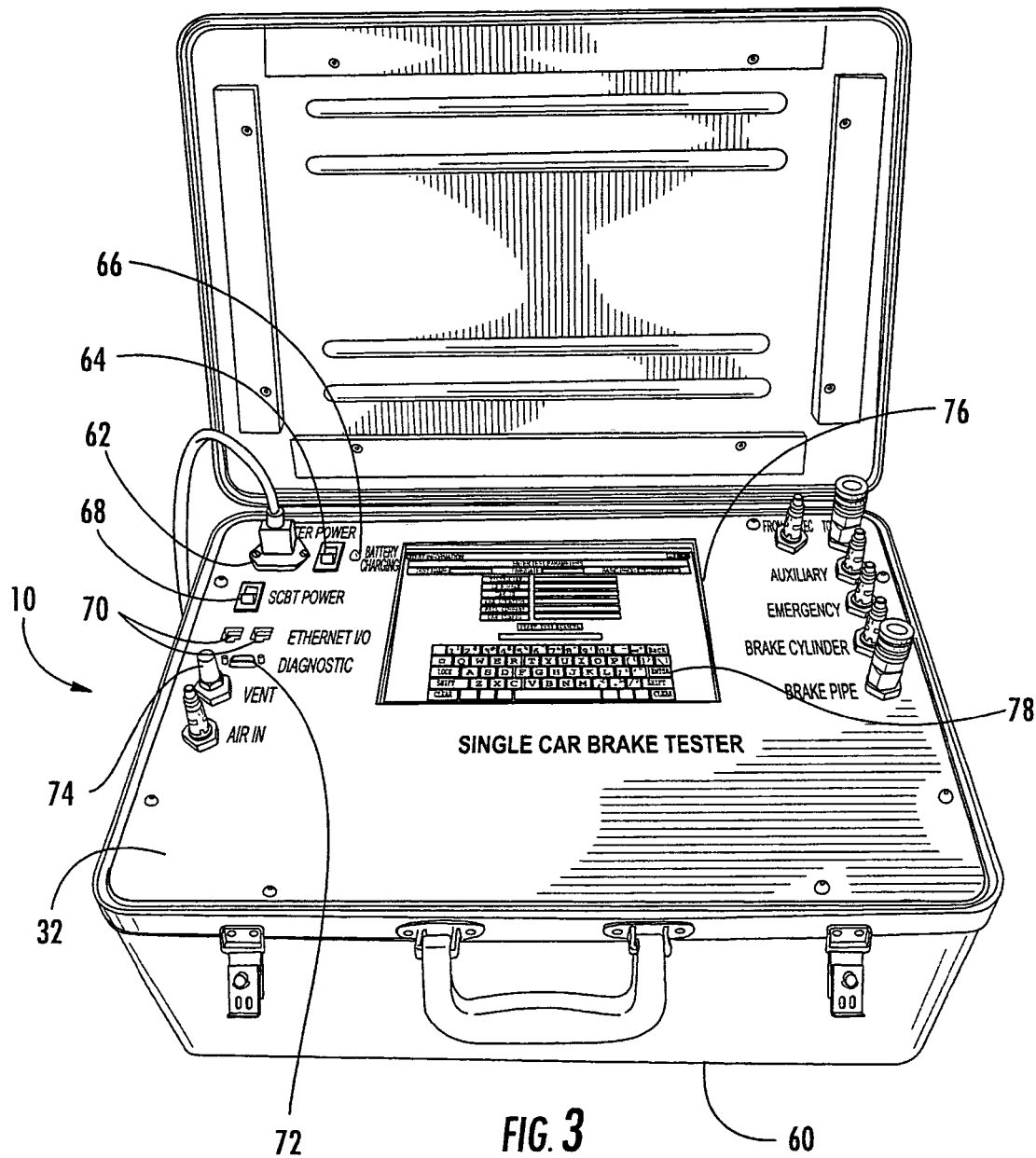
FIG. 3 is a perspective view of an embodiment of the present invention.
Figure 4:
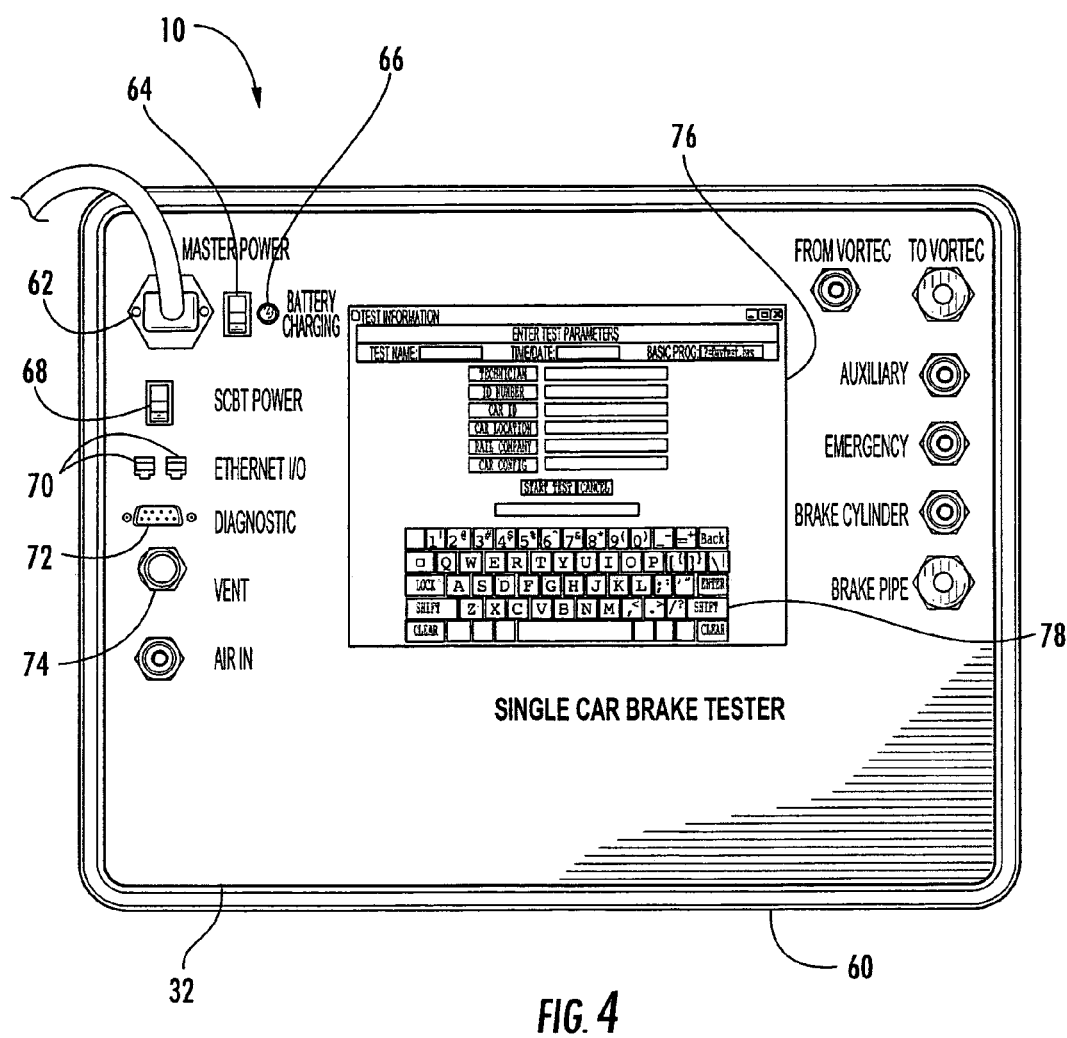
FIG. 4 is a top plan view of the embodiment shown in FIG. 3.

FIGS. 3 and 4 illustrate one embodiment of the test device 10 in which the pneumatic and electrical circuits are mounted in a briefcase-sized container 60. The container 60 provides a portable and secure enclosure for storing, moving, protecting, and setting up the test device 10 at remote locations. A sufficiently sized container 60 is approximately 18 inches wide by 14 inches long by 12 inches deep, although larger or smaller containers are within the scope of the present invention, depending on the particular embodiment. In addition, the container 60 may include wheels or tires on one side to further facilitate mobility and ease of transport.

As shown, the test device 10 includes a front panel 32 containing various switches and connectors for providing power and test air to the test device, for connecting the test device to the brake system being tested, and for communicating to and from the test device. Referring to the left side of FIG. 4, the front panel 32 includes an IEC style connector 62 for receiving external power, such as 115 VAC, into the test device 10. The IEC connector 62 may include a surge protector, such as a 2 amp fuse, to protect the electrical circuit 14 from harmful electrical transients. A two position rocker switch 64 next to the IEC connector 62 and labeled MASTER POWER isolates the external power from the electrical circuit 14 in the OFF position, and permits external power to be applied to the battery charger (if included) in the ON position. A light 66 next to the master power switch 64 indicates the status of battery charging. Below the master power switch 64 is a two position rocker switch 68 labeled SCBT POWER for energizing the test device 10 with either internal or external power. Below the SCBT POWER switch 68 is a pair of Ethernet I/O plugs 70 for connecting the web server interface 30 to an Internet service provider (ISP) or external microcomputer. A serial connector labeled DIAGNOSTIC 72 provides a connection for performing diagnostic checks of the electrical circuit. A vent 74 in the front panel 32 provides a filtered opening through the front panel 32 to permit test air vented from the pneumatic circuit 12 to escape to the environment. The remainder of the fittings on the front panel are quick disconnect, or "Glad-Hand," pneumatic fittings for connecting the pneumatic circuit 12 to various sources, as labeled in FIG. 4 and previously discussed with respect to FIG. 1.

The center of the front panel 32 includes an optional display panel 76, such as a CRT, LED, OLED, or LCD display. As shown, the display panel 76 may also include a data entry device 78, such as a conventional keyboard or other touch-screen device, for communicating with the control circuit 28.

The present invention also includes a novel method for testing a rail car brake system using an embodiment of the test device as previously described and illustrated. As previously described with respect to FIG. 1, the method includes connecting a supply of test air 16 to a valve manifold 18. The valve manifold 18 generally emulates the test device described and illustrated in Standard S-486. The method further includes operatively connecting a control circuit 28 to the valve manifold 18, as shown in FIG. 2, and connecting the valve manifold 18 to the brake pipe of the rail car brake system being tested. If revised programming instructions are required, the method includes retrieving the programming instructions from a predetermined web page or source external to the test device 10. The programming instructions are communicated to the control circuit 28, and the control circuit 28 executes the programming instructions to selectively position the valve manifold 18 and measure test air parameters such as pressure and flow rate.

In some embodiments, the method for testing a rail car brake system may further include recording measurements of said test air for subsequent download to a predetermined web page or other external storage location. In addition, where environmental temperatures are excessively hot or cold, the method may further include diverting a portion of the test air through a thermal mechanism 52 for selectively heating or cooling the test device 10.

It should be appreciated by those skilled in the art that modifications and variations can be made to the embodiments of the invention set forth herein without departing from the scope and spirit of the invention as set forth in the appended claims and their equivalents.

What is claimed is:

1. A rail car brake system test device comprising:
   a. an air supply to provide test air to a rail car brake system;
   b. a valve manifold connected between said air supply and the rail car brake system, wherein said valve manifold includes
      i. a valve for selectively supplying and venting said test air to or from the rail car brake system and
      ii. a sensor for measuring said test air;
   c. a control circuit operatively connected with said valve manifold for selectively positioning said valve and recording a measurement from said sensor;
   d. a power supply connected to said control circuit for providing electrical power to said control circuit; and
   e. a web server interface in communication with said control circuit and configured to receive programming instructions from a predetermined web page and to communicate said programming instructions to said control circuit for selectively positioning said valve manifold according to said programming instructions.

2. The rail car brake system test device as in claim 1, wherein said valve manifold includes a solenoid operated valve positioned by said control circuit.

3. The rail car brake system test device as in claim 1, wherein said valve manifold includes a pressure sensor for measuring the pressure of said test air.

4. The rail car brake system test device as in claim 1, wherein said valve manifold includes a flow sensor for measuring the flow rate of said test air.

5. The rail car brake system test device as in claim 1, wherein said valve manifold includes a thermal bypass valve for diverting a portion of said test air for selectively heating or cooling said rail car brake system test device.

6. The rail car brake system test device as in claim 1, wherein said control circuit includes non-volatile memory for recording measurements of said test air.

7. The rail car brake system test device as in claim 1, wherein said power supply includes a rechargeable battery.

8. The rail car brake system test device as in claim 1, wherein said web server interface is configured to receive data from said control circuit and to communicate said data to a location external to said test device.

9. The rail car brake system test device as in claim 1, further including a data entry device for communicating with said control circuit.

10. The rail car brake system test device as in claim 1, further including a web browser for accessing said predetermined web page.

11. A rail car brake system test device comprising:
    a. an air supply to provide test air to a rail car brake system;
    b. a valve manifold connected between said air supply and the rail car brake system, wherein said valve manifold includes
       i. a valve for selectively supplying and venting said test air to or from the rail car brake system and
       ii. a sensor for measuring said test air;
    c. a control circuit operatively connected with said valve manifold for selectively positioning said valve and recording a measurement from said sensor;
    d. a power supply connected to said control circuit for providing electrical power to said control circuit; and
    e. a web server interface in communication with said control circuit and configured to receive programming instructions from a source external to said rail car brake system test device and to communicate said programming instructions to said control circuit for selectively positioning said valve manifold according to said programming instructions.

12. The rail car brake system test device as in claim 11, wherein said valve manifold includes a solenoid operated valve positioned by said control circuit.

13. The rail car brake system test device as in claim 11, wherein said valve manifold includes a pressure sensor for measuring the pressure of said test air.

14. The rail car brake system test device as in claim 11, wherein said valve manifold includes a flow sensor for measuring the flow rate of said test air.

15. The rail car brake system test device as in claim 11, wherein said valve manifold further includes a thermal bypass valve for diverting a portion of said test air for selectively heating or cooling said rail car brake system test device.

16. The rail car brake system test device as in claim 11, wherein said control circuit includes non-volatile memory for recording measurements of said test air.

17. The rail car brake system test device as in claim 11, wherein said power supply includes a rechargeable battery.

18. The rail car brake system test device as in claim 11, wherein said web server interface is configured to receive data from said control circuit and to communicate said data to a location external to said test device.

19. The rail car brake system test device as in claim 11, wherein said source external to said rail car brake system test device is a microprocessor having said programming instructions.

20. The rail car brake system test device as in claim 11, wherein said source external to said rail car brake system test device is a predetermined web page having said programming instructions.

21. The rail car brake system test device as in claim 11, further including a data entry device for communicating with said control circuit.

22. The rail car brake system test device as in claim 11, further including a web browser for accessing said source external to said rail car brake system test device.

23. A method for testing a rail car brake system using a test device comprising:
   a. connecting a supply of test air to a valve manifold;
   b. connecting said valve manifold to the rail car brake system;
   c. operatively connecting a control circuit to said valve manifold;
   d. retrieving programming instructions from a predetermined web page;
   e. communicating said programming instructions to said control circuit;
   f. executing said programming instructions through said control circuit to selectively position said valve manifold according to said programming instructions; and
   g. measuring said test air.

24. The method for testing a rail car brake system of claim 23, wherein said measuring said test air includes measuring a pressure of said test air.

25. The method for testing a rail car brake system of claim 23, wherein said measuring said test air includes measuring a flow rate of said test air.

26. The method for testing a rail car brake system of claim 23, further including recording measurements of said test air.

27. The method for testing a rail car brake system of claim 23, further including transmitting said measurements of said test air to a location external to said test device.

28. The method for testing a rail car brake system of claim 23, further including diverting a portion of said test air through a thermal mechanism for selectively heating or cooling said test device.

29. A method for testing a rail car brake system using a test device comprising:
   a. connecting a supply of test air to a valve manifold;
   b. connecting said valve manifold to the rail car brake system;
   c. operatively connecting a control circuit to said valve manifold;
   d. retrieving programming instructions from a source external to said test device;
   e. communicating said programming instructions to said control circuit;
   f. executing said programming instructions through said control circuit to selectively position said valve manifold according to said programming instructions; and
   g. measuring said test air.

30. The method for testing a rail car brake system of claim 29, wherein said retrieving programming instructions from a source external to said test device includes retrieving programming instructions from a microprocessor external to said test device.

31. The method for testing a rail car brake system of claim 29, wherein said retrieving programming instructions from a source external to said test device includes retrieving programming instructions from a predetermined web page.

32. The method for testing a rail car brake system of claim 29, wherein said measuring said test air includes measuring a pressure of said test air.

33. The method for testing a rail car brake system of claim 29, wherein said measuring said test air includes measuring a flow rate of said test air.

34. The method for testing a rail car brake system of claim 29, further including recording measurements of said test air.

35. The method for testing a rail car brake system of claim 29, further including transmitting said measurements of said test air to a location external to said test device.

36. The method for testing a rail car brake system of claim 29, further including diverting a portion of said test air through a thermal mechanism for selectively heating or cooling said test device using said test air.

* * * * *